(12) United States Patent
Blackburn et al.

(10) Patent No.: US 6,748,401 B2
(45) Date of Patent: Jun. 8, 2004

(54) METHOD AND SYSTEM FOR DYNAMICALLY MANAGING HASH POOL DATA STRUCTURES

(75) Inventors: Robert A. Blackburn, Hopewell Junction, NY (US); Robert O. Dryfoos, Hopewell Junction, NY (US); Gary A. Fisher, Sr., Poughkeepsie, NY (US); Glenn W. Sears, Jr., Ulster Park, NY (US)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 09/974,977

(22) Filed: Oct. 11, 2001

(65) Prior Publication Data

US 2003/0074341 A1 Apr. 17, 2003

(51) Int. Cl.[7] ............................................... G06F 7/00
(52) U.S. Cl. ................................................... 707/104.1
(58) Field of Search ........................... 707/104.1, 102, 707/100, 103 Y, 3

(56) References Cited

U.S. PATENT DOCUMENTS

| | | | |
|---|---|---|---|
| 5,276,878 A | * | 1/1994 | Sutton et al. ................ 711/112 |
| 5,410,663 A | * | 4/1995 | Blackburn et al. ............. 711/3 |
| 5,604,879 A | * | 2/1997 | Beavers et al. ............. 711/207 |
| 5,809,494 A | | 9/1998 | Nguyen ........................ 707/1 |
| 5,893,086 A | | 4/1999 | Schmuck et al. ............... 707/1 |
| 5,911,144 A | | 6/1999 | Schwartz et al. ........... 707/206 |
| 6,014,733 A | | 1/2000 | Bennett ...................... 711/216 |
| 6,067,547 A | | 5/2000 | Douceur ..................... 707/100 |
| 6,115,802 A | | 9/2000 | Tock et al. .................. 711/216 |
| 6,122,375 A | | 9/2000 | Takaragi et al. ............... 380/28 |
| 6,212,525 B1 | | 4/2001 | Guha ......................... 707/101 |
| 6,216,214 B1 | | 4/2001 | Bryg et al. .................. 711/207 |
| 6,226,629 B1 | | 5/2001 | Cossock ........................ 707/3 |
| 6,226,639 B1 | | 5/2001 | Lindsay et al. ................. 707/5 |
| 6,230,231 B1 | | 5/2001 | DeLong et al. ................. 711/3 |
| 6,516,320 B1 | * | 2/2003 | Odom et al. ................. 707/101 |
| 6,630,946 B2 | * | 10/2003 | Elliott et al. ................. 345/781 |

FOREIGN PATENT DOCUMENTS

| | | |
|---|---|---|
| EP | 0 066 766 A2 | 12/1982 |
| EP | 0 066 766 B1 | 8/1988 |

OTHER PUBLICATIONS

Title: "Extendible Chained Bucket Hashing for Main Memory Databases"; Published by: International Journal of Applied Software Technology, vol. 1, No. 2, pp. 123–125; Author: Pyung–Chul Kim, Kee–Wook Rim, Jin–Pyo Hong.

(List continued on next page.)

*Primary Examiner*—Safet Metjahic
*Assistant Examiner*—Sana Al-Hashemi
(74) *Attorney, Agent, or Firm*—Andrew J. Wojnicki, Jr.; Cantor Colburn LLP

(57) ABSTRACT

An exemplary embodiment of the present invention is a method for dynamically managing a hash pool data structure. A request to insert a new key value into a hash pool data structure that includes at least one index level is received. An insertion location is calculated for the new key value in response to the new key value and to existing key values in the hash pool data structure. The insertion location includes an index level. A new index level is added at the insertion location if the index level is not the maximum number of index levels in the hash pool data structure; if the insertion location contains a chain of existing key values with a length equal to the maximum chain length; and if the new index record locations of the new key value and the existing key values are dispersed. The insertion location is updated in response to adding a new index record and the new key value is inserted into the insertion location. An additional embodiment includes a system and storage medium for dynamically managing a hash pool data structure.

20 Claims, 5 Drawing Sheets

OTHER PUBLICATIONS

Title: "Linear Spiral Hashing for Expansible Files", Published by: IEEE Transactions on Knowledge and Data Engineering, vol. 11, No. 6, pp. 969–984, Nov./Dec. 1999, Authors: Ye–In Chang, Chien I Lee, Wann–Bay ChangLiaw.

Title: "Climbing Hashing for Expansible Files", Published by: Information Sciences, vol. 86, No. 1–3, pp. 77–99, Sep. 1995, Authors: Ye–In Chang, Chien–I Lee.

Title: "Multikey, Extensible Hashing for Relational Database", Published by: IEEE Software, vol. 5, No. 4, pp. 77–85, Jul. 1988, Authors: Keith L. Kelley and Marek Rusinkiewicz.

Title: "Linear Hashing with Separators– A Dynamic Hashing Scheme Achieving One–Access Retrieval", Published by: ACM Transactions on Database Systems, vol. 13, No. 3, pp. 366–388, Sep. 1988, Author: Per–Ake Larson.

Title: "Linear Hashing with Overflow–Handling by Linear Probing", Published by; ACM Transactions on Database Systems, vol. 10, No. 1, pp. 75–89, Mar. 1985, A04, Author: Per–Ake Larson.

Title: "Evaluation of Associative Memory Using Parellel Chained Hashing", Published by: IEEE Transactions on Computers, vol. C–33, No. 9, pp. 851–855, Sep. 1984, Auther: Kei Hiraki, Kenji Nishida, and Toshio Smimada.

Title: "Linear Hashing: A New Tool For File And Table Addressing", Published by: IEEE Computer Society, Very Large Data Bases. Proceedings of the Sixth International Conference, pp. 212–223, 1980, Author: Witold Litwin.

* cited by examiner

METHOD AND SYSTEM FOR DYNAMICALLY MANAGING HASH POOL DATA STRUCTURES

FIELD OF THE INVENTION

The present invention relates generally to dynamically managing hash pool data structures. More particularly, the present invention relates to dynamically adding index and contention records to hash data pools in response to data load and data distribution.

BACKGROUND OF THE INVENTION

Hashing is a technique for storing and retrieving data records. Hash functions provide quick access to individual data cells in a group, via a hash table, without linear searching. Therefore, hashing is especially beneficial for computational problems that grow into a very large scale in terms of data volume. A variety of hash functions can be implemented in order to minimize collisions between key values and to minimize processing time for a particular group of data key values. The decision to use a particular hash function is implementation dependent. A collision between key values occurs when the output of the hash function is the same for two or more records. When a collision occurs, one of the key values might, based on bucket size, be stored in another location and not the location indicated by the hash function. Collision resolution management refers to the process of determining where the other location is and tying the key value into the hash pool data structure in a manner that is accessible at a later point in time.

If the hash table is very large, it may not fit into available memory. A large hash table may be kept on a disk storage device such as DASD (Direct Access Storage Device). When the hash table is kept on disk storage the hash function or the operating system, in response to a request from the hash function, reads a portion of the entire hash table and must manage the process of paging the hash table. When this happens, the speed of processing can be diminished because of the extra time for the Input/Output (I/O) operations and the extra processing overhead required to manage the hash table. When the hash records are stored on external storage devices such as DASD, it is important to minimize the number of accesses to the hash records. When the hash records are stored on DASD the hash function may be compute intensive with the goal of minimizing the number of I/O operations required to insert or retrieve a record from the hash pool data structure. Hash technique exists that keep a small piece of information in memory to quickly find the hash table entry. If the hash table is very large even these techniques exhaust main memory so this associated information must also be placed on DASD which increases the I/O required.

An index can be used to reduce the required hash table space. This option requires at least one extra I/O operation. The benefit is a reduction in the number of required hash table records that must be pre-allocated. The number of "slots" that can be contained in a hash table record determines how much the hash table space can be reduced. If a four-thousand and ninety-six byte (4K) record size is used, and an allowance is made to use ninety-six bytes for system overhead, the 4K record could hold five-hundred eight byte storage addresses. In this scenario, the use of a one level index could reduce the required number of pre-allocated hash table records by a factor of five hundred. A second level index could reduce the number of pre-allocated hash table records by another factor of five-hundred, resulting in a reduction of two-hundred and fifty thousand. Similarly, a third level index reduces the requirement by a factor of one-hundred and twenty-five million but adds three required I/O operations in retrieving a data record if the index records are stored on DASD.

Contention of keys to the same hash slot can be handled with record chaining. A look-up routine can detect that there is more than one record and can examine the contents of the record for an exact match. The average number of I/O operations required in chaining can be expressed by the equation "(k+1)/2" where "k" is the length of the chain. The chain can be implemented using a linked list that connects the records together. After a hash function is performed on a key value, a sequential search is performed on the linked list until either the key value is found or the spot to insert the key value is located. The linked list could be sorted in terms of frequency of access or alphabetically to expedite the search.

Contention of names can also be handled with contention records. A look-up routine can detect that the record is a contention record and that the record contains a table of key values and record addresses. The look-up routine can go through the record looking for a match of the key value, and if found, can use the record address that corresponds to the key value to locate a user data record. Any of the above methods: indexes, contention records and chaining; can be utilized when contention is encountered in a hash pool data structure. Which one is selected depends on balancing factors that can include the number of I/O operations, the required storage space, the number of hash table entries, and the required speed of data access.

SUMMARY OF THE INVENTION

An exemplary embodiment of the present invention is a method for dynamically managing a hash pool data structure. A request to insert a new key value into a hash pool data structure that includes at least one index level is received. An insertion location is calculated for the new key value in response to the new key value and to existing key values in the hash pool data structure. The insertion location includes an index level. A new index level is added at the insertion location if the index level is not the maximum number of index levels in the hash pool data structure; if the insertion location contains a chain of existing key values with a length equal to the maximum chain length; and if the new index record locations of the new key value and the existing key values are dispersed. The insertion location is updated in response to adding a new index record and the new key value is inserted into the insertion location. An additional embodiment includes a storage medium for dynamically managing a hash pool data structure.

DETAILED DESCRIPTION OF THE INVENTION

The disclosed invention is a method of dynamically managing hash pool data structures by combining the use of indexing, chaining, and contention records in an effort to reduce the I/O operations and DASD requirements of hash tables used to process data in a very large data pool. The method described in the disclosed invention can be utilized in any hashing implementation but it is especially effective when used with large hash tables containing highly changeable tables or tables with high insertion rates, such as Internet mail user lists or Internet domain name lists. In an exemplary embodiment, the hash data pool is initialized with one level of indexing, but has the ability to selectively add more levels of index records at the points in the data structure where data is clustering. Alternatively, a new record being inserted may cause the creation of a contention record or the new record being inserted may be chained to an existing record. The decision about which alternative to take when a new record being inserted causes contention is performed by software and is based on many factors that include the data dispersion, the data load, the number of resulting I/O operations, and the number of index levels available. In the disclosed invention these techniques to deal with contention are used together, and shifted into and out of use as the number of entries saved in the hash space changes. Records can be initially single indexed and chained. As more entries end up in the same hash value range, the chain can be changed to a contention record or into a level two index. The decision about which method to use to insert a new record into the hash pool data structure and building the associated data structures is performed dynamically as the record is being inserted.

Figure 1:
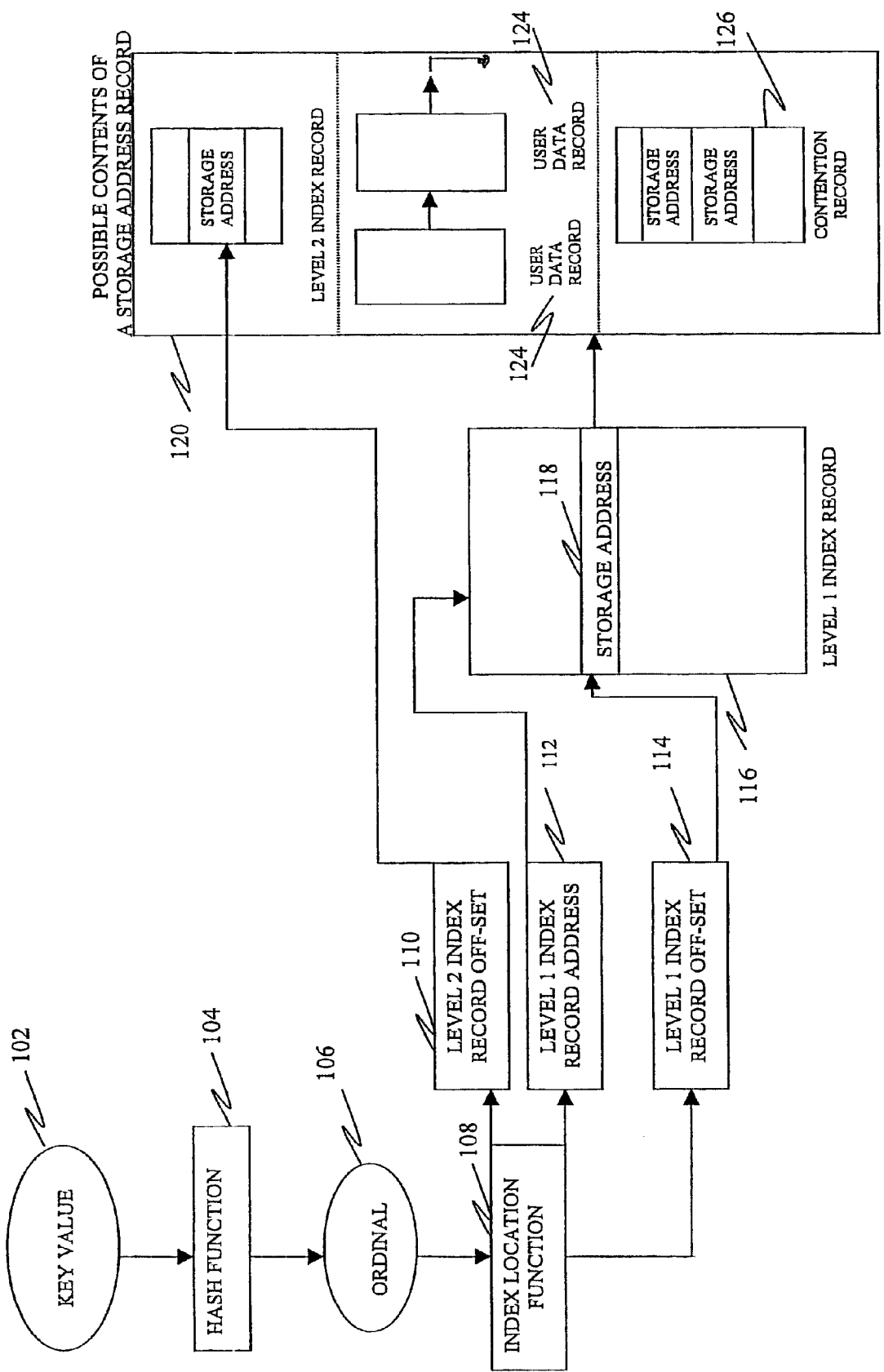
FIG. 1 is a block diagram of an exemplary embodiment of a system for dynamically managing hash pool data structures.

FIG. 1 is a block diagram of an exemplary embodiment of a system for dynamically managing hash pool data structures. The process starts out with a key value 102 being entered into a hash function 104. The hash function could be any hash function that is known in the art. One example of a hash function is to take the EBCDIC or ASCII value of a portion of the key value 102 and add the values of each portion. The sum of the values of each portion are then modulo divided by a prime number just under the hash table size to yield "x", the output value or ordinal 106, where x is greater than or equal to zero and less than or equal to one less than the prime number. The ordinal 106 is then input into an index location function 108 which will produce pointers to the indexes associated with the ordinal 106. In an exemplary embodiment, the maximum number of index levels are decided by the system administrator during system set-up and before the hash table is populated with data. For example, the expected number of data records accessed via a hash table could be two-hundred and fifty million. If no indexing is implemented, two-hundred and fifty million records would need to be pre-allocated. This alternative is costly in terms of potentially unused storage space because many records would be empty until the hash table becomes heavily populated with key values. In an exemplary embodiment, the hash table records are broken up into 4K bytes with each record holding up to five-hundred eight-byte storage addresses or slots. If one level of indexing is used in this exemplary embodiment, then five-hundred thousand records would need to be pre-allocated for an expected hash table size of two-hundred and fifty million data records. This is calculated by dividing the size of the expected hash table by the number of slots per record. If two level of indexes are used in this example, then one-thousand 4K byte records would need to be pre-allocated. This can be calculated by dividing the expected hash table size by five-hundred raised to the second power.

Referring to FIG. 1, the index location function 108, in the exemplary embodiment described above that includes two levels of indexing, calculates at least three values. The first value, level one index record address 112, is a pointer to the storage location of the level one index record 116 that corresponds to the key value 102 that was input. It can be calculated by the formula "(x mod y) mod n", where "x" is the ordinal 106 from the hash function 104, "y" is the number of slots in each second level index record 122, and "n" is the number of slots in each first level index record 116. The second value, level one index record off-set 114, points to the slot in the level one index record that corresponds to the key value 102. In the exemplary embodiment described above, it can be calculated using the formula "(x mod y) rem n." The third value, level two index record off-set 110, points to the slot in the level two index record that corresponds to the key value 102 and can be calculated by the formula "x rem y." A variety of formulas can be implemented to produce the outputs from the index location function 108. The choice of formulas depends on many factors including the size of the hash table, the size of the records, and the number of levels of indexing. The three formulas described are examples of ones that would work for an exemplary embodiment that includes a hash table size of two-hundred and fifty million data records, hash table index records that are 4K bytes in size, and a data structure that includes two levels of indexing.

The level one index records 116, as depicted in FIG. 1, can be stored on a storage device (e.g. DASD) or they can be stored in main memory. In the exemplary embodiment described above, where the hash table size is estimated at two-hundred and fifty million, the one-thousand level one index records 116 would be stored on DASD. Referring to FIG. 1, a storage address is contained in the slot 118 in the level one index record 116 that is pointed to by the level one index record off-set 114. Alternatively, the slot could contain a zero which would indicate that the slot is empty and available for data insertion. In an exemplary embodiment, a key value could be stored in the slot for quick access to the right record. In another exemplary embodiment, only the address of the data record associated with the key value is stored in the slot. In this application, a reference to inserting a key value refers to either inserting data that includes the actual key value and associated address or to inserting data that includes just the associated address. The storage addresses contained in the slots 118 can include storage addresses of three different types of records 120. First, the storage address contained in the slot 118 could hold a record 120 that is a level two index 122. The level two index record off-set 110, that was calculated by the index location function 108, would point to the slot in the level two index table 122 that corresponds to the key value 102. This slot could be empty (contain a zero), or it could contain a storage address that holds either a user data record 124 or a contention record 126. Second, the level one index record 116 slot 118 could contain a storage address that holds a user data record 124. The user data record 124 contains the data associated with the key value 102. The user data record 124 could be a single record or it could be part of a chain of user data records 124 as depicted in FIG. 1. In an exemplary embodiment the chain could be implemented using a linked list data structure.

Third, and as depicted in FIG. 1, the slot 118 in the level one index record 116 could also contain the storage address of a record that holds a contention record 126. In an exemplary embodiment, the contention record 126 is a 4K byte that has 100 slots for user data record 124 storage addresses. In an exemplary embodiment, contention records 126 can be chained. Finally, Another possibility is that the slot 118 in the level one index record 116 does not contain a storage address because it is empty (contains a zero). This would be the case if no data had been inserted into this slot 118. When this occurs, the storage address of the associated user data record 124 could be entered directly into the slot.

The hash function 104, the index location function 108, and the process that manages the hash pool data structures can be implemented by software and executed on any host hardware platform under any operating system. In an exemplary embodiment the host hardware platform is a mainframe and the operating system is Transaction Processing Facility (TPF). The hash pool data structures and the software are stored on any kind of storage device including both main memory, disk storage directly connected to the host hardware platform, and disk storage that is remote from the host hardware platform. In an exemplary embodiment all hash pool data structures and software are stored on disk storage (e.g. DASD) that is directly connected to the host hardware platform. The users of the software can be local to the host hardware platform or they can be remote and access the software across a network such as a local area network (LAN), wide area network (WAN), the Internet, an intranet, or any kind of network that is known in the art. All or portions of the software could execute on a remote system, for example the hash function and index location function software may be stored and executed on a remote user system while the hash pool data structure management software is being executed on the host hardware platform. In an exemplary embodiment the users of the software are local to the host hardware platform.

Figure 2:
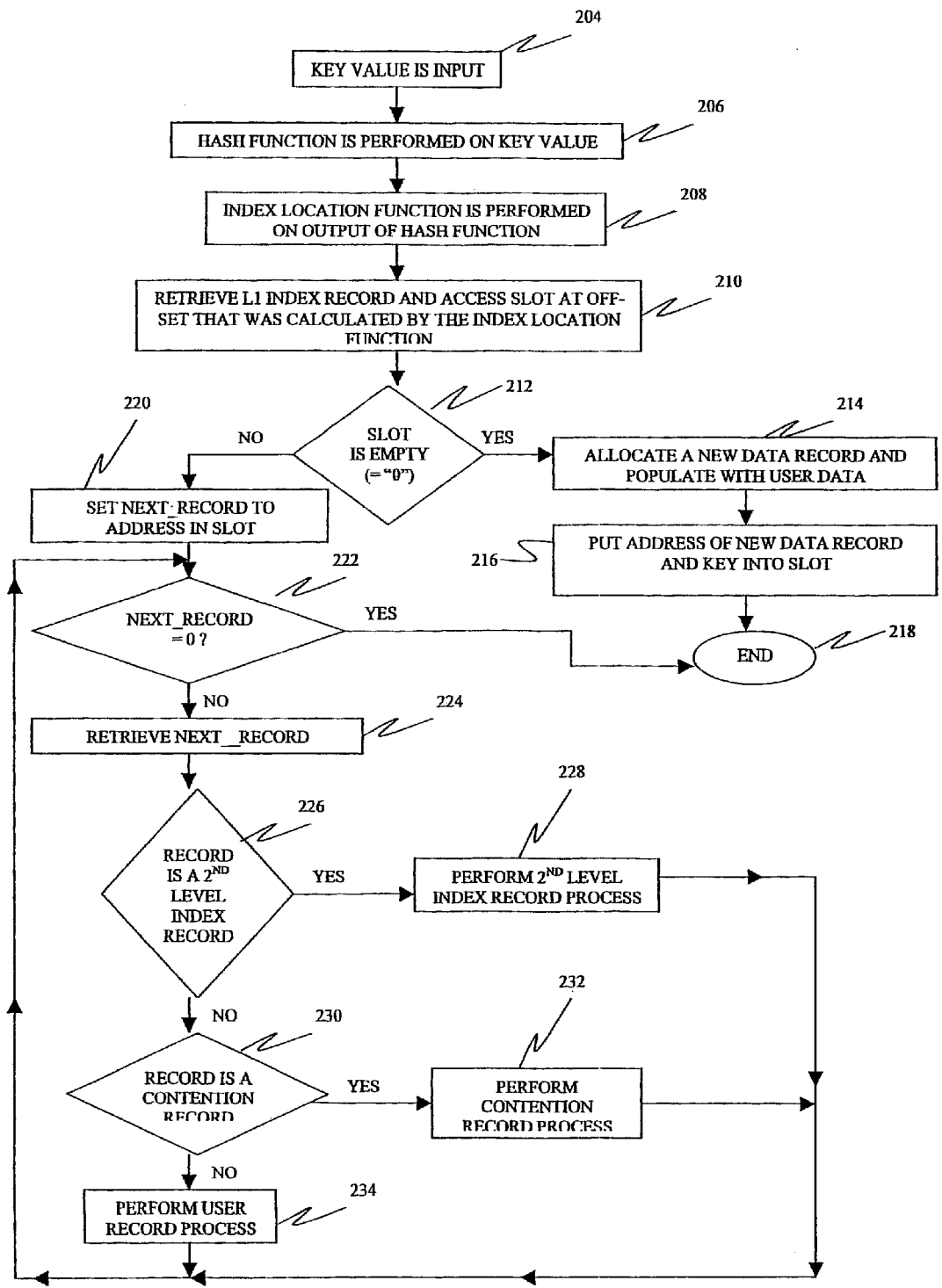
FIG. 2 is a flowchart of an exemplary high level process for inserting a record into a hash pool.

FIG. 2 is a flowchart of an exemplary high level process for inserting a record into a hash pool utilizing the disclosed invention. First, the key value is hashed and the index location values are calculated. Then, a loop performed where the records at referenced storage locations are retrieved and analyzed until a place to insert the record is located and the record is inserted. The process starts at step 202 and a key value is input at step 204. The hash function is performed on the key value at step 206 which results in a hash value as output. As discussed previously, a variety of hash functions could be implemented depending on factors that include the expected distribution of the data, the data load, and the size of the hash table. Next, at step 208, the index location function is performed using the ordinal value that is output from the hash function. In an exemplary embodiment including two levels of indexes, the index location function produces three results: the level one index ordinal 112, the level one index record off-set 114, and the level two index record off-set 110. A function is provided that takes an ordinal 112 and produces a record address which contains the exact DASD location of the record. At step 210, the level one index record is retrieved and it is accessed at the slot that is pointed to by the level one index record off-set 114.

Step 212 determines if the slot is empty. In an exemplary embodiment this would be indicated by the slot containing the value of zero. If the slot is empty it means that the slot has not been accessed before and that the slot is available for data insertion and step 214 is performed. Step 214 allocates a new data record and populates it with the user data that is associated with the key value. Then, at step 216, the address of the new data record is stored in the slot. Step 218 is then performed and the inserting process is complete.

Alternatively, step 220 is performed, if at step 212 it was determined that the slot was not empty. At step 220 the variable "next_record" is set equal to the address contained in the slot. Then, step 222 is performed which starts a loop that is performed until the next_record variable is equal to zero. Once the next-record variable is equal to zero processing is complete and step 218 is performed to end the program. If the next-record variable is not equal to zero then the record with the address stored in next-record is retrieved from storage at step 224. At step 226 a check is made to see if the record is a second level index record. If it is a second level index record then step 228 is performed and the function to perform the second level index process is invoked. When the process invoked by step 228 returns the next step is 222. If the record retrieved from storage is not a second level index record then step 230 is performed. At step 230 a check is made to determine if the record is a contention record. If it is a contention record then step 232 is performed and the function to perform the contention record process is invoked. Again, once the process returns control, a loop is made back up to step 222. If the record is not a contention record then step 234 is performed and the perform user record process is invoked. When the control returns to step 234, a loop is made back up to step 222. When the process depicted in FIG. 2 is ended at step 218, a key value has been inserted into the hash pool data structure and a new storage record containing user data has been created and tied to the key value. If the key value is a duplicate then an error message stating that the key value was found is created and the key value is not inserted.

Figure 3:
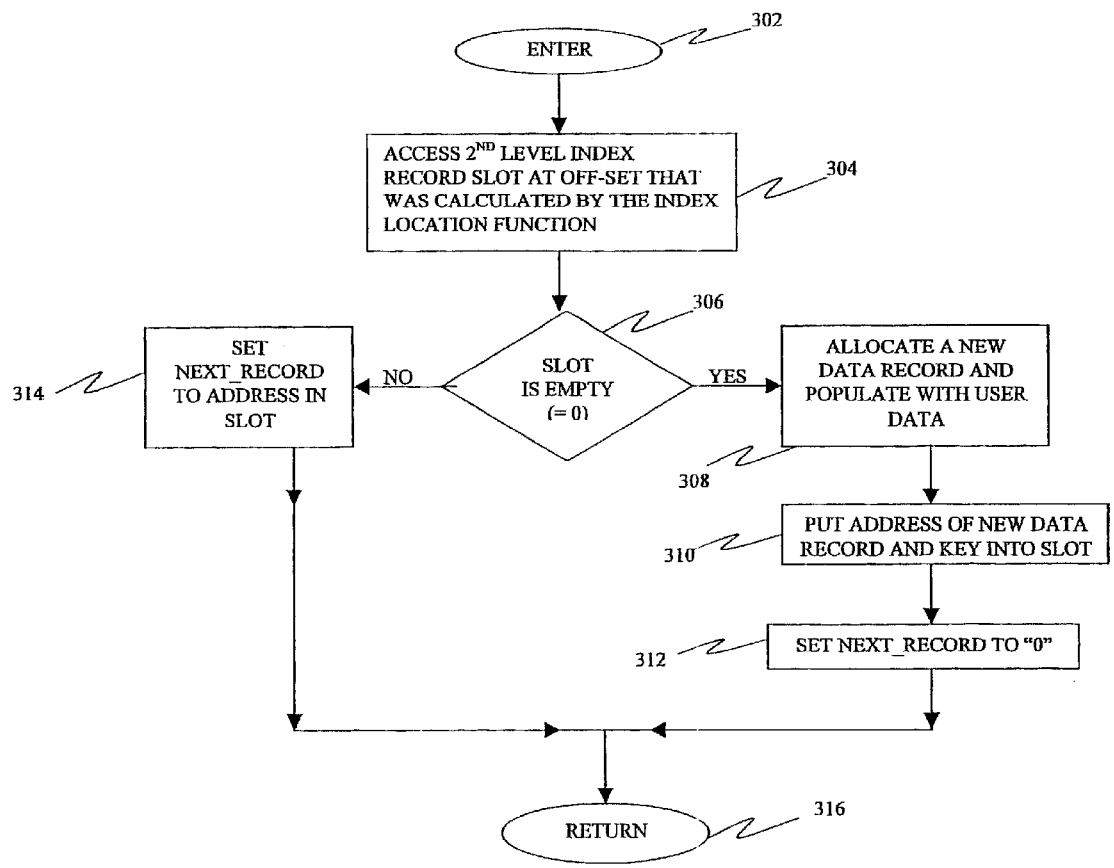
FIG. 3 depicts an exemplary process for inserting a record into a second level index data structure.

FIG. 3 depicts an exemplary process for inserting a record into a second level index data structure. It is invoked by step 228 in FIG. 2 and the process is entered at step 302. At step 304 the second level index record is accessed at the slot pointed to by the level two index record off-set 110 as calculated by the index location function 108. At step 306 a check is made to determine if the slot is empty. If the slot is empty then the key value and associated storage address can be inserted in the slot and step 308 is performed to start this process. At step 308 a new data record is allocated and the new data record is populated with the user data. Then, step 310 is performed and the address of the new data record is entered into the slot. Next, at step 312, the next_record variable is set to zero to signal to the calling program that the record has been inserted and that processing is complete. The process then returns at step 316 to the calling program in FIG. 1. Alternatively, step 314 is performed if the slot is not empty as determined at step 306. Step 314 is performed if the index slot contains an address and therefore is not available for inserting the new data key. At step 314 the next-record variable is set to the address contained in the slot and processing control is returned at step 316 to the calling program in FIG. 1.

Figure 4:
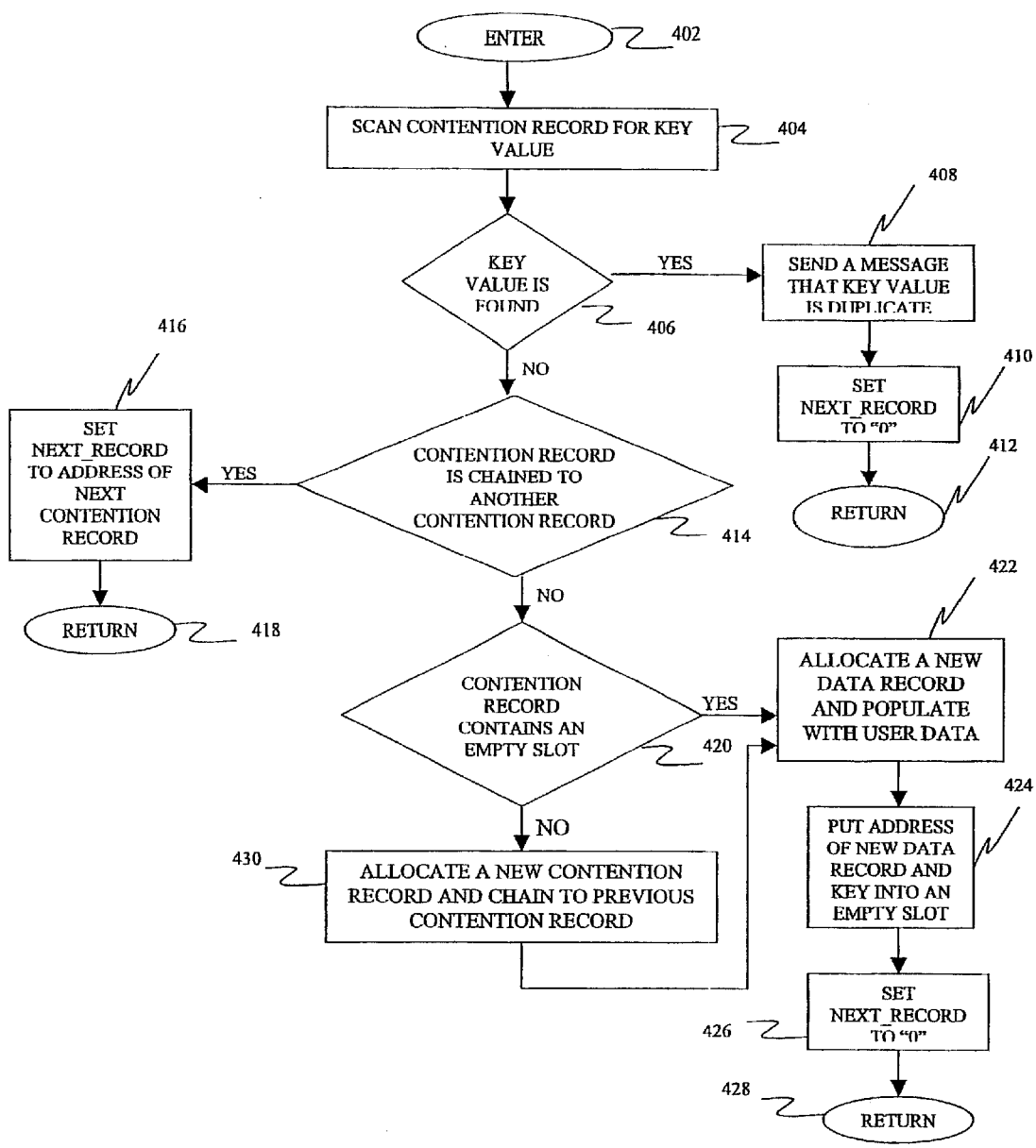
FIG. 4 depicts an exemplary process for inserting a record into a contention record data structure.

FIG. 4 depicts an exemplary process for inserting a record into a contention record data structure. The process is entered at step 402 when it is called by step 232 in FIG. 2. At step 404, the contention record is scanned to see if it already contains the key value. If the key value is found, as determined at step 406, a message telling of the duplicate key is created and sent to the calling program or system user. Then, at step 410, the next_record variable is set to zero and the processing control is returned to the calling program at step 412. If, at step 406 it is determined that the key value does not exist in this contention record, step 414 is performed. Step 414 determines if the contention record is chained to another contention record. If the contention record is chained to another contention record step 416 is performed. At step 416 the address of the next contention record in the chain is entered into the variable next_record and control is returned to the calling program at step 418.

Alternatively, in an exemplary embodiment, if at step 414 it is determined that the contention record is not chained to another contention record, step 420 is performed. Step 420 is used to determine if the contention record contains an empty slot for entering the key value and data record address. If the contention record is full and does not contain an empty slot then step 430 is performed. At step 430 a new contention record is allocated and chained to the previous contention record. The new contention record is labeled as a contention record. Processing continues with step 422. If the contention record is not full, as determined at step 420, then step 420 is skipped and processing continues with step 422. At step 422 a new data record is allocated and the new data record is populated with the user data associated with the key value. Then, at step 424, the address of the new data record and key value are entered into the next empty slot in the contention record. The next_record variable is set to zero at step 426 and processing control is returned to the calling program at step 428.

Figure 5:
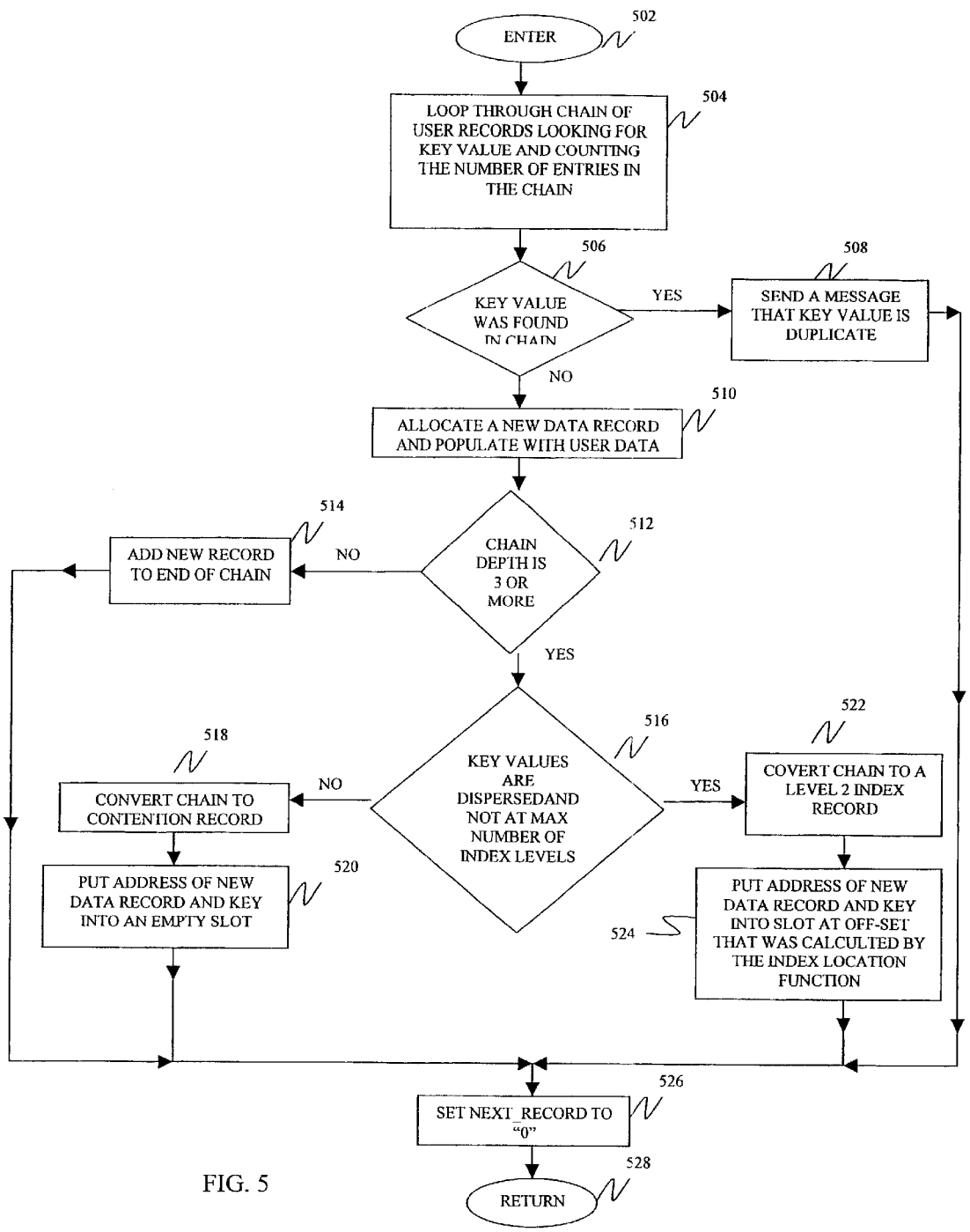
FIG. 5 depicts an exemplary process for inserting a record into a user record data structure.

FIG. 5 depicts an exemplary process for inserting a record into a user record data structure. The process is entered at step 502 when it is called by step 234 in FIG. 2. During this process, a determination is made, based on factors that include data load and data distribution, to insert the record as another user record data structure in a chain, to create a level two index record, or to create a contention record. At step 504, the chain of user records are retrieved and scanned, looking for the key value and counting the number of entries or depth of the chain. In an exemplary embodiment the chain will contain one, two or three records. If the key value is found, as determined at step 506, a message is sent about the attempt to insert a duplicate key and that the record was found and processing continues at step 526. If the key value was not found in the chain, as determined at step 506, step 510 is performed. At step 510 a new data record is allocated and the new data record is populated with the user data associated with the key value. Step 512 checks to see if the chain depth is three or more. If the current chain depth is one or two, step 514 is performed and the new record is added to the end of the current chain. Processing then continues at step 526. In an exemplary embodiment, the current chain could be put in order in terms of frequency of access or it could be ordered alphabetically.

In an exemplary embodiment, if the chain depth is three or more, processing continues with step 516. Step 516 determines if the key values are dispersed and if the maximum number of index levels, two in this example, have already been reached. In an exemplary embodiment, the key values are dispersed if all four contain different values for their level two index record off-set 110 as determined by the index location function 108. If the four values are distinct then the keys are determined to be dispersed and step 522 is performed. In this case it makes sense to create a level two index, if one does not already exist, because the key values will point to different slots in the index and cut back on the number of I/O operations required to access the user data record. At step 522 the chain is converted to a level two index record. A new level two index record is allocated and the address of the new index record is entered into the slot corresponding to the key value in the level one index record. The key values from the chain and addresses of the associated data records are entered into the level two index record slots as determined by the level two index record off-set 110 and the records are re-chained from each other. In addition, the new level two index record is labeled as a level two index record. Then, at step 524, the address of the new data record and the key value are entered into the slot in the level two index table corresponding to the level two index record off-set 110 as determined by the index location function 108. Processing then continues with step 526.

If it is determined, at step 516, that the keys are not dispersed or that the maximum number of index levels have already been reached, processing continues with step 518. If the keys have duplicate level two index record off-sets 110 and are therefore not dispersed, a contention record will be created in order to save on the average number of I/O operations required to access a data record. Additionally, if the maximum number of index levels have already been used, a contention record will be created. Step 518 converts the chain to a contention record. A new contention record is allocated and the address of the new contention record is entered into the slot corresponding to the key value in the level one or level two index record. The new contention record is labeled as a contention record. The key values from the chain and addresses of the associated data records are entered into the contention record slots. At step 520 the address of the new data record and the associated key value are entered into an empty slot of the new contention record. Processing then continues at step 526. At step 526, the next-record variable is set to zero because one of two things has happened in the process described in FIG. 5. Either the new user record has been inserted or a duplicate key has been found. In both cases processing of the new record is complete. Finally, at step 528, control is passed back to the calling program in FIG. 2.

Each implementation may select a particular maximum chain depth based on factors that include where the index records are stored and the importance of high speed I/O operations. A chain depth of three or less can be used in an exemplary embodiment, where all the records are stored on DASD, there are two levels of index records available, and each record holds five-hundred storage addresses. It is at this point in an exemplary embodiment, where the fourth record is chained to the linked list, that the average number of I/O operations involved in chaining becomes higher than the average number of I/O operations if contention records or level two indexes are utilized. This number at which chaining becomes less efficient is implementation specific and can be adjusted based on the requirements of a specific implementation.

Similarly, the determination of what constitutes dispersion can also vary between implementations. In an exemplary embodiment, the level two index record off-sets 110 associated with the three key values in the chain and the new key value being inserted are compared. If any of the level two index record off-sets 110 are the same a determination is made that the key values are not dispersed. Adding a level two index record would not result in eliminating I/O operations for each of the key values. Therefore, in an exemplary embodiment a level two index record would not be added in this case. Again, other determinations, based on implementation factors, and trade-offs between I/O operations and storage space can be made.

The disclosed invention describes the process of inserting a new key value and associated user data into a hash pool data structure. The resulting structure can be used to locate a particular user record given a key value using methods that are known in the art. In addition, methods that are known in the art can be utilized to delete and consolidate remaining records. These methods can include remove from chain, remove from contention record, and remove from second level index. They can also include methods that reverse the tasks including: removing a contention record when only two entries remain, and building a chain from the remaining two entries. Similar methods are available for the second level index.

The disclosed invention can handle extremely large hash tables. These hash tables are so large that associative tables, such as those in linear hashing are too large to be held in main memory. The disclosed invention uses an index, stored on DASD, that adds one I/O operation but increases the size of the hash space that is possible to address. In an exemplary embodiment, such as the one described in reference to FIG. 1, the hash pool data structures can all be stored on DASD. Therefore, accessing a level one index table requires one I/O operation. In an exemplary embodiment, the use of the hash function along with an index location function removes the requirement for the entire hash table to be segmented in order to be stored on DASD. The disclosed invention utilizes a technique of taking the ordinal returned from the hash function and using it as input into the index location function. In this way the hash table is not in local memory but is distributed among several DASD volumes and can therefore be extremely large. Further, the hash function and index location function are compute intensive and do not require additional I/O operations in order to determine the ordinal or index location of a particular key value. The disclosed invention also eliminates the need for special case hash table management functions that require paging and other overhead requirements associated with a segmented hash table. The use of one or more layers of index records that can be added dynamically reduces the DASD requirement for unused hash entries. The trade-off is that each index record layer adds an additional I/O operation. The hash pool data structure described in the disclosed invention can be built dynamically as the hash table fills up.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention not be limited to the particular embodiments for carrying out this invention, but that the invention will include all embodiments falling within the scope of the appended claims.

What is claimed is:

1. A method for dynamically managing a hash pool data structure, said method comprising:

receiving a request to insert a new key value into a hash pool data structure, said hash pool data structure including at least one index level;

calculating an insertion location for said new key value in said hash pool data structure in response to said new key value and existing key values, wherein said insertion location includes an index level;

adding a new index record at said insertion location if:
said index level is not equal to a preselected maximum number of index levels;
said insertion location contains a chain of said existing key values with a length equal to a maximum chain length; and
new index record locations of said new key value and said existing key values are dispersed;

updating said insertion location in response to said adding a new index record; and inserting said new key value into said insertion location.

2. The method of claim 1 wherein said new index record locations of said new key value and said existing key values are dispersed if less than a selected number of duplicate insertion locations would result if said new key value and said existing key values were inserted into said new index record.

3. The method of claim 1 wherein said preselected maximum number of index levels is equal to two.

4. The method of claim 1 further comprising:

adding a new contention record at said insertion location in response to not performing said adding a new index record and if said insertion location contains a chain of said existing key values with a length equal to said maximum chain length; and updating said insertion location in response to said adding a new contention record.

5. The method of claim 1 wherein said maximum chain length is equal to three.

6. The method of claim 1 wherein said calculating an insertion location for said new key value comprises:

executing a hash function in response to said new key value, wherein said output of said hash function includes an ordinal value;

executing an index location function in response to said ordinal value, wherein said output of said index location function includes an index record address and index off-set data; and retrieving and analyzing said existing key values in response to said index record address, said index off-set data, and said new key value wherein said output of said analyzing is said insertion location for said new key value.

7. The method of claim 1 wherein said hash pool data structure includes index records, contention records, user data records, chained contention records, and chained user data records.

8. The method of claim 1 wherein said adding a new index record comprises:

allocating a new index record;

updating said insertion location with said address of new index record; and updating said new index record with said existing key values in said chain.

9. The method of claim 4 wherein said adding a new contention record comprises:
- allocating a new contention record;
- updating said insertion location with said address of new contention record; and
- updating said new contention record with said existing key values in said chain.

10. The method of claim 1 further comprising:
- receiving a request to insert new user data, wherein said new user data corresponds to said new key value; and
- allocating a new user data record in response to said request; and
- storing said new user data record address at said insertion location.

11. A storage medium encoded with machine-readable computer code for dynamically managing a hash pool data structure, the storage medium storing instructions for causing a computer to implement the method comprising:
- receiving a request to insert a new key value into a hash pool data structure, said hash pool data structure including at least one index level;
- calculating an insertion location for said new key value in said hash pool data structure in response to said new key value and existing key values, wherein said insertion location includes an index level;
- adding a new index record at said insertion location if:
  - said index level is not equal to a preselected maximum number of index levels;
  - said insertion location contains a chain of said existing key values with a length equal to a maximum chain length; and
  - new index record locations of said new key value and said existing key values are dispersed;
- updating said insertion location in response to said adding a new index record; and
- inserting said new key value into said insertion location.

12. The storage medium of claim 11 wherein said new index record locations of said new key value and said existing key values are dispersed if less than a selected number of duplicate insertion locations would result if said new key value and said existing key values were inserted into said new index record.

13. The storage medium of claim 11 wherein said preselected maximum number of index levels is equal to two.

14. The storage medium of claim 11 further comprising instructions for causing the computer to implement:
- adding a new contention record at said insertion location in response to not performing said adding a new index record and if said insertion location contains a chain of said existing key values with a length equal to said maximum chain length; and
- updating said insertion location in response to said adding a new contention record.

15. The storage medium of claim 11 wherein said maximum chain length is equal to three.

16. The storage medium of claim 11 wherein said calculating an insertion location for said new key value comprises:
- executing a hash function in response to said new key value, wherein said output of said hash function includes an ordinal value;
- executing an index location function in response to said ordinal value, wherein said output of said index location function includes an index record address and index off-set data; and
- retrieving and analyzing said existing key values in response to said index record address, said index off-set data, and said new key value wherein said output of said analyzing is said insertion location for said new key value.

17. The storage medium of claim 11 wherein said hash pool data structure includes index records, contention records, user data records, chained contention records, and chained user data records.

18. The storage medium of claim 11 wherein said adding a new index record comprises:
- allocating a new index record;
- updating said insertion location with said address of new index record; and
- updating said new index record with said existing key values in said chain.

19. The storage medium of claim 14 wherein said adding a new contention record comprises:
- allocating a new contention record;
- updating said insertion location with said address of new contention record; and
- updating said new contention record with said existing key values in said chain.

20. The storage medium of claim 11 further comprising instructions for causing the computer to implement:
- receiving a request to insert new user data, wherein said new user data corresponds to said new key value; and
- allocating a new user data record in response to said request; and
- storing said new user data record address at said insertion location.

* * * * *